Figure 1:
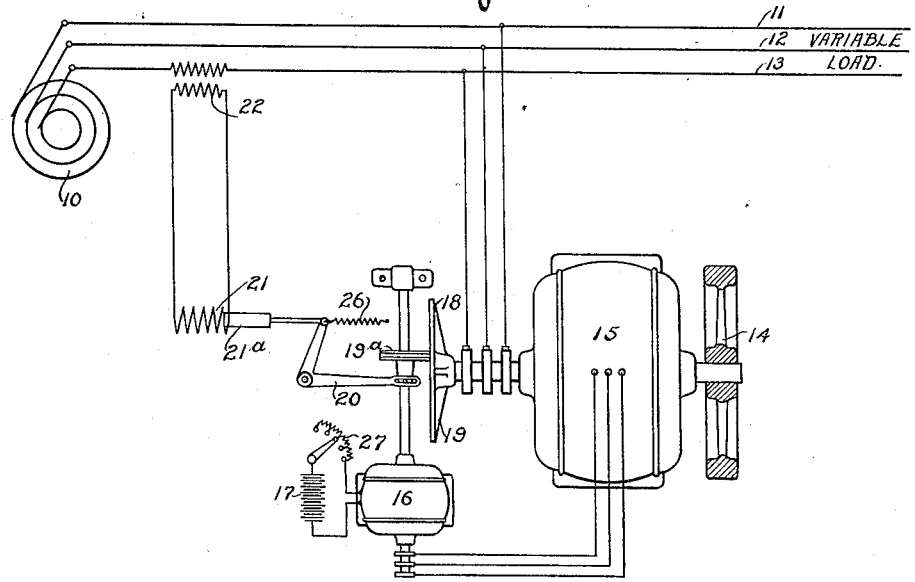

J. L. JOHNSON.
SYSTEM OF DISTRIBUTION.
APPLICATION FILED JUNE 27, 1910.

1,139,294.

Patented May 11, 1915.

UNITED STATES PATENT OFFICE.

JOHN L. JOHNSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

SYSTEM OF DISTRIBUTION.

1,139,294.        Specification of Letters Patent.        Patented May 11, 1915.

Application filed June 27, 1910. Serial No. 568,971.

*To all whom it may concern:*

Be it known that I, JOHN L. JOHNSON, a citizen of the United States, residing at Milwaukee, in the county of Milwaukee and State of Wisconsin, have invented certain new and useful Improvements in Systems of Distribution, of which the following is a full, clear, and exact specification.

My invention relates to systems of electrical distribution.

In many electrical systems there is a fluctuation of the load between very wide limits, the upper limit often exceeding the capacity of the generator supplying the system. In systems of this sort, it has been proposed to connect across the line a dynamo-electric machine whose rotating member has large inertia, which machine acts as a motor to store up kinetic energy when the load on the line is light and as a generator driven by such stored energy when the load on the line is heavy.

It is the object of my present invention to obtain in a system of this sort, a simple and reliable arrangement by which the storing and giving up of the kinetic energy may be more readily and accurately controlled. In attaining this object, a rather novel arrangement is used by which the relation between the synchronous speed of the dynamo-electric machine and the speed at which such machine is actually rotating under the influence of the rotating mass in which kinetic energy is stored, is varied, preferably under the control of the load on the circuit. In the arrangements illustrated there is a dynamo-electric machine having a rotating member of large inertia, one member of this machine being connected across the circuit to be controlled and the other to an auxiliary circuit supplied by an auxiliary alternating current generator of variable frequency. The speed at which such dynamo-electric machine runs is governed by the frequency of the current supplied by the auxiliary generator. When the load is light, current is supplied by the auxiliary generator at a frequency which allows the dynamo-electric machine to rotate at its maximum motor speed, and to act as a motor to store up kinetic energy in its massive rotating member. When the load is heavy, the auxiliary generator supplies a current at a frequency which tends to slow down the dynamo-electric machine and make it act as a generator, driven by the stored energy in its rotating member, to supply energy to the circuit. The rate at which the dynamo-electric machine takes energy from the line or gives energy to the line may be adjustable. Preferably the whole operation is automatically controlled by the load on the circuit.

The various novel features of my invention will be apparent from the description and drawings and will be particularly pointed out in the claims.

Figure 2:
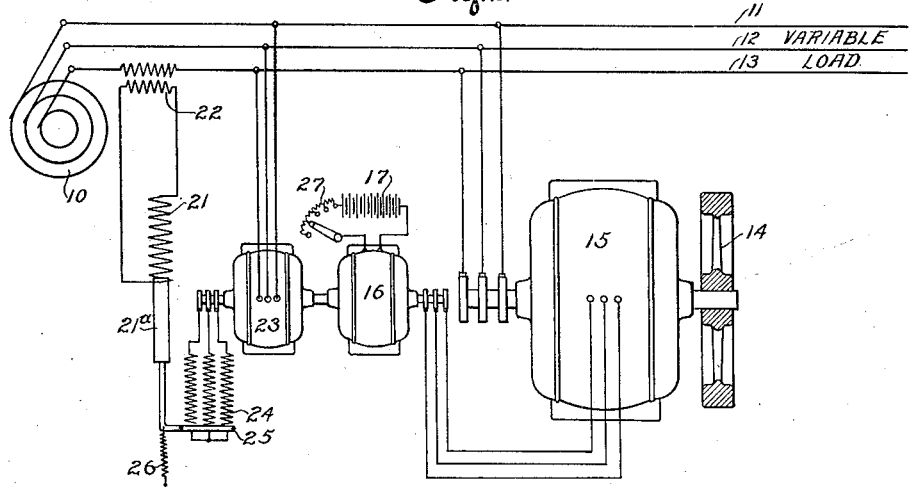

Figure 1 is a diagrammatic view of one embodiment of my invention; and, Fig. 2 shows a modification.

The generator 10 supplies the distribution circuit 11—12—13, on which there is a load which fluctuates fairly rapidly within wide limits. This load may be of any character, but the invention is especially applicable to those cases where the variable load is a power load, consisting, for instance, of one or more rolling mill motors. The generator 10 is here shown as a three phase generator, but my invention in its broader aspect is not necessarily so limited. Connected to the circuit 11—12—13 is a dynamo-electric machine, the rotating member of which has large inertia, as by being mechanically connected to a fly-wheel 14. This dynamo-electric machine is arranged to act as a motor to store up energy in the fly-wheel when the load on the circuit 11—12—13 is light, and as a generator driven by the energy in the fly-wheel to supply current to the circuit 11—12—13 when the load on such circuit is heavy. The arrangement for controlling the consumption and production of energy by the dynamo-electric machine and fly-wheel constitutes the essence of my present invention.

In the arrangements shown the dynamo-electric machine consists of an alternating current motor 15 having both members excited by three phase current. The synchronous speed of this motor is varied by changing the frequency of the current supplied to one of these members. As shown, this variable synchronous speed is obtained by connecting one member, here taken as the rotor, of the motor 15 across the circuit 11—12—13 and the other, here the stator, to the armature of an alternating current generator 16, the field of this generator being excited from any suitable source of direct current, such as a storage battery 17 regulated by a rheostat 27. The frequency of the current supplied by the generator 16 is varied by changing the speed at which it is driven. Two schemes are shown in the drawings for changing the speed of the generator 16. In the arrangement shown in Fig. 1 the generator 16 is driven by the motor 15. Connected to the shaft of the motor 15 is a variable speed friction drive 18 of the usual construction, consisting of a driving disk 19 coupled to the shaft of the motor 15, and a driven disk 19$^a$ free to slide vertically on the shaft of the generator 16. The disk 19$^a$ is moved along the shaft of the generator 16 by a bell crank 20 which is operated by the movement of the core 21$^a$ of the solenoid 21. The speed at which the generator 16 rotates is dependent upon the position of the disk 19$^a$ relative to the center of the disk 19. In the arrangement shown in Fig. 2 the generator 16 is driven by a three phase induction motor 23 connected to the circuit 11—12—13 and having a variable resistance 24 in its secondary. The resistance 24 is varied by a short-circuiting bar 25 which is operated by the core 21$^a$ of the solenoid, 21, as shown. In either arrangement, the motor 15 may be started in any desired manner. The solenoid 21 is connected as through a current transformer 22, so that it is responsive to the current in the circuit 11—12—13. When the load on the circuit 11—12—13 is below a predetermined value, the core 21$^a$ and its coöperating parts are in the positions shown. In Fig. 1 the disk 19$^a$ is shown at some distance from the periphery of the disk 19 and in Fig. 2 all the resistance is shown in the secondary of the motor 23. The result is that the generator 16 is rotated at a very low speed, a low-frequency current being supplied to the stator of the motor 15. This low-frequency current creates a slowly revolving magnetic field in the stator of the motor 15, which field revolves in the same direction relatively to the stator as does the magnetic field in the rotor relatively to the rotor itself, or in the opposite direction to the direction of rotation of the rotor itself. The rotor of the motor 15 now rotates at a synchronous speed which is comparatively high, so that it stores up energy in the flywheel 14. As the load on the circuit 11—12—13 increases, the solenoid 21 moves the core 21$^a$ and its coöperating parts against the action of the spring 26, and thereby causes the generator 16 to be rotated at a higher rate of speed. In the arrangement in Fig. 1, the increase in the speed of the generator 16 is attained by a movement of the disk 19$^a$ away from the center of the disk 19, and in that of Fig. 2 by a movement of the short-circuiting bar upward to cut out the resistance in the secondary member of the motor 23. Because of the increase in the speed of the generator 16, a higher frequency current is supplied to the stator of the motor 15, the amount of the increase in frequency being dependent upon the distance the core 21$^a$ is moved against the action of the spring 26. As the frequency of the current supplied by the generator 16 increases, the magnetic field of the stator of the motor 15 revolves at a higher rate of speed. This lowers the synchronous speed of the motor 15. As the actual speed of the motor 15 is above its synchronous speed after this operation takes place, and as its actual speed tends to follow its synchronous speed, the motor tends to slow down; but, driven by the energy stored in the fly wheel in slowing down it acts as a generator to return current to the circuit 11—12—13. Thus the increase in load on the circuit 11—12—13 is taken largely by the motor 15 acting as a generator, and the load on the main generator 10 is maintained substantially constant; for the solenoid 21 and its coöperating parts are so designed that the core 21$^a$ is moved throughout its entire range of movement upon any slight changes in the current supplied to its solenoid 21. The cycle above described is repeated whenever the load on the circuit 11—12—13 fluctuates above its normal value, and tends to vary the load on the generator 10.

Two specific embodiments of my invention have been described in the foregoing, but the invention is not limited to such embodiments. Other means for varying the frequency of the current supplied to one member of the dynamo-electric machine 15 may be used besides those shown, and it is not necessary in all cases that the dynamo-electric machine be of the three phase type, or that three phase currents be supplied to both members of the machine. The large inertia needed, may, of course, be inherent in the rotor of the dynamo-electric unit or may be obtained by having a separate flywheel mechanically connected to such rotor, as by being mounted on the shaft therewith. Both forms are included when such expressions as "dynamo-electric unit having a rotating member of large inertia" are used. The changes in the synchronous speeds of the dynamo-electric machine 15 may be obtained by varying the frequency of the current supplied to its stator either in the same or the opposite sense as the desired change is speed, though in the arrangement shown the parts are designed for changes in the opposite sense. Either member of the dynamo-electric machine 15 may be connected to the circuit 11—12—13, or to the generator 16, as desired.

Many other modifications may be made in the precise arrangements shown and described, without departing from the spirit and scope of my invention, and all such I aim to cover in the following claims.

What I claim as new is:

1. In combination, an electric circuit, a motor having one member connected to said circuit, supplying current to another member of said motor, and means responsive to the load on said circuit and coöperating mechanically with said motor for varying the frequency of the current supplied to the other member of said motor.

2. In combination, two alternating current circuits, a motor having a rotating member of large inertia, said circuits being connected to separate members of said motor, a mechanical variable-speed connection between said motor and the generator supplying one of said circuits, and means responsive to the load on the other of said circuits for varying the frequency of the current in the first circuit.

3. In combination, two alternating current generators, a motor the two members of which are connected respectively to the circuits of said generators, and a mechanical variable speed device operated by said motor for driving one of said generators, said variable speed device being adjustable to vary the speed of said latter generator in response to changes in load on the circuit supplied by the other generator.

4. In combination, two alternating current circuits, a variable-speed generator supplying one of said circuits, a motor whose synchronous speed is dependent upon the relative frequencies of said circuits, a mechanical speed-varying connection between said motor and said generator for driving the latter, and means responsive to the load on one of said circuits for actuating said speed-varying connection to vary said relative frequencies.

5. In combination, a main alternating current generator, an auxiliary alternating current generator, circuits supplied by said generators, a motor having two members connected respectively to said circuits, and a mechanical variable-speed device driven by said motor and responsive to the load on said main generator for driving said auxiliary generator.

6. In combination, an alternating current circuit, a generator, a motor having one member connected to said circuit and the other to said generator, a mechanical variable-speed driving connection between said generator and said motor, and means responsive to the load on said circuit for actuating said variable-speed connection to vary the speed of said generator.

7. In combination, an alternating current distribution circuit carrying a variable load, an auxiliary source of current of variable frequency, an alternating current dynamo-electric unit having a rotating member of large inertia, one member of said unit being connected to said circuit and the other member to said source of variable frequency current, a mechanical variable-speed connection between said dynamo-electric unit and said source of current of variable frequency, and means responsive to the load on said circuit for actuating said variable-speed connection to change the frequency of the current of said source.

8. In combination, two alternating current circuits, one of said circuits having a variable load, the other of said circuits having a variable frequency, a motor having a rotating element of large inertia, each of said circuits being connected to one element of said motor, a mechanical variable-speed connection between said motor and a generator supplying said circuit of variable frequency, and means responsive to the load on said variable load circuit for actuating said variable-speed connection to vary the frequency of the current in the other circuit to vary the synchronous speed of said motor relatively to the actual speed thereof when the load on the first circuit varies.

Milwaukee, Wis., June 17, 1910.

In testimony whereof I affix my signature, in the presence of two witnesses.

JOHN L. JOHNSON.

Witnesses:
 CHAS. L. BYRON,
 GEO. B. SCHLEY.

Copies of this patent may be obtained for five cents each, by addressing the "Commissioner of Patents, Washington, D. C."